March 10, 1925.

F. A. BENFORD

MEANS FOR TRUING REFLECTORS

Filed June 12, 1922

1,529,292

Inventor:
Frank A. Benford,
by His Attorney.

Patented Mar. 10, 1925.

1,529,292

UNITED STATES PATENT OFFICE.

FRANK A. BENFORD, OF SCHENECTADY, NEW YORK, ASSIGNOR TO GENERAL ELECTRIC COMPANY, A CORPORATION OF NEW YORK.

MEANS FOR TRUING REFLECTORS.

Application filed June 12, 1922. Serial No. 567,839.

*To all whom it may concern:*

Be it known that I, FRANK A. BENFORD, a citizen of the United States, residing at Schenectady, in the county of Schenectady, State of New York, have invented certain new and useful Improvements in Means for Truing Reflectors, of which the following is a specification.

My invention relates to truing and adjusting means for light reflectors. This invention is especially adapted for use in connection with large size reflectors. It is not uncommon to find that the mirror of a 60" searchlight is out of true when mounted on the searchlight drum and that consequently the light beam is not round or symmetrical with respect to the axis of the reflector. Also it is not uncommon to find that if the reflector is true at the time of mounting, it becomes distorted when moved from one locality to another. The distortion may be large or it may be small but in any event it affects the revealing power of the light and there are instances in which a loss as great as 30 per cent has been found in the central beam intensity due to such distortion. The greatest distorting effect is found about the edges of the mirror and particularly in the neighborhood of the horizontal diameter because of the location of the trunnions in that neighborhood.

Figure 1:
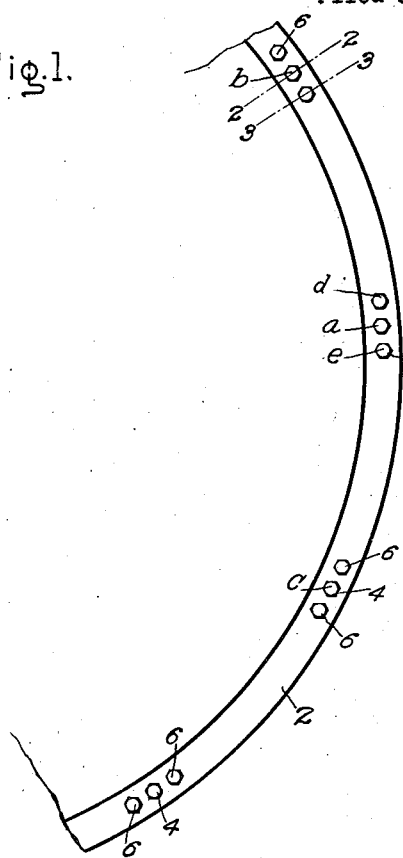
Figure 2:
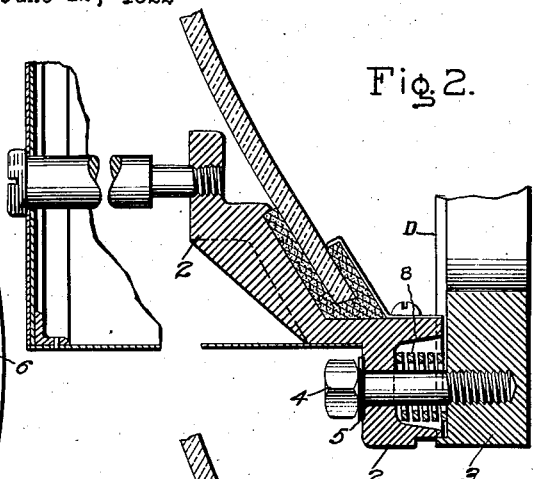
Figure 3:
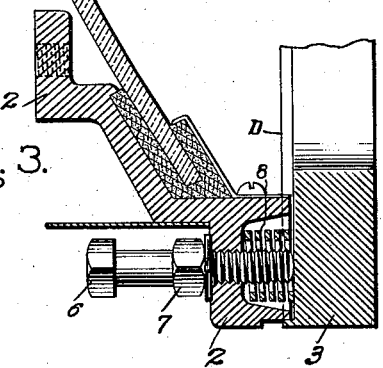
Figure 4:
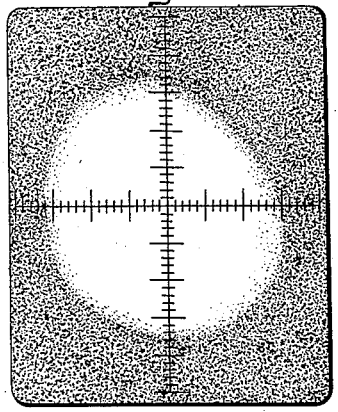
Figure 5:
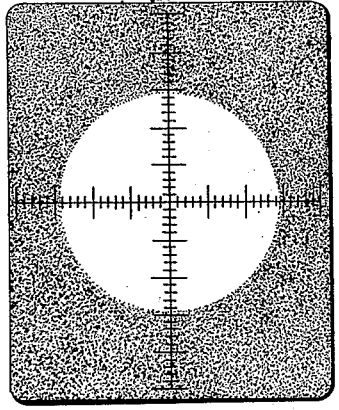

By means of my invention it is possible to apply strains of varying degrees at one or more points about the circumference of the mirror ring to bring the mirror or reflector back to true thereby relieving the mirror from any distorting strains due to mounting the mirror in position. The means by which the above objects are obtained will be now more fully set forth in detail and claimed, reference being had to the accompanying drawing wherein:

Fig. 1 is a view in elevation of the mirror ring the view being taken from the rear of the reflector; Fig. 2 is a section in elevation taken on line 2—2 Fig. 1 and through the longitudinal axis of the reflector and mounting mechanism and showing the mirror, mirror ring and rear ring; Fig. 3 is a section taken on line 3—3 Fig. 1; Fig. 4 shows a distorted beam thrown on a target upon which target two measuring scales are shown at right angles to each other; Fig. 5 shows an undistorted beam thrown on a target similar to that shown in Fig. 4.

Referring more in detail to the drawing it will be seen that the mirror or reflector ring 2 is secured to the rear ring 3 of the drum D by a number of bolts 4 the threads of which engage threaded holes in the rear ring 3. These bolts are provided with washers 5 between the head and the ring 2. On either side of each bolt 4 there is provided in the ring 2 a threaded hole, which holes receive the studs 6 each of which is provided with a washer and a lock nut 7 as shown. By means of these bolts and studs the mirror 9 may be trued up very readily in case of distortion. By means of the studs 6 the mirror ring may be sprung or adjusted away from the end ring 3. It is evident that by the opposing action of the bolts and the studs the mirror ring can be moved away from or toward the ring 2 at any point or at a number of points about the circumference and held permanently in the new position. As indicated in the drawing, this operation can take place at any one of 12 points around the margin of the mirror which latter is mounted on the ring 2. Obviously the number of points at which such adjusting means are applied may be varied. It is necessary to use a stud on either side of each bolt inasmuch as if a single stud is used a local bending action is set up in the ring which would be objectionable.

To test for mirror distortion, whether local or general, it is only necessary to throw the beam of light reflected from the mirror on a target such as that shown in Figs. 4 and 5 which may be located at about 150 feet from the mirror and note how the section of the beam appearing on the target compares with a previously drawn circle. A general distortion of the mirror will result in a general distortion of the beam giving an oval projection on the target as illustrated in Fig. 4. If the beam is round as indicated in Fig. 5, the reflector need not be adjusted, but if distorted as indicated in Fig. 4, an adjustment should be made as follows: The lamp should be started and the beam turned on the target. The bolt nearest in line with the shortest radius, bolt $b$, for example, Fig. 1, should be loosened and the studs or set screws $d$ and $e$ on either side of bolt $b$ should now be screwed down, pulling the mirror ring away from the end ring until the edge of the beam approaches the circle on the target whereupon the loose bolt b should be tightened. The same process may then be repeated at the point of next shortest radius and so on until the beam is round as in Fig. 5. After all adjustments are made, all the bolts should be tried to see that the ring is held firmly in position. Therefore, by holding the ring against the end ring at least one point and springing the ring at one or more points around its circumference, the beam of light if distorted can be very quickly and effectively restored.

Obviously, therefore, I provide a simple and effective means for truing up a mirror or reflector by the use of which warping strains in the mirror may be readily relieved or corrected. I make use of a simple mechanical device which enables me to perform the adjusting operations with precision. When I use the term "mechanical device" in this specification, I mean any device in which the ratio of motion of a point on the power applying element to a point on the mirror is greater than 1, such as a screw or a lever of the first class.

It will be understood that, if desired, between the rings 2 and 3 a flat helical spring may be placed, such as the spring 8. This spring may be coiled about the bolt 4 as shown or about the stud 6. Also it is possible to omit the studs altogether and rely altogether on the springs.

It will be obvious that by tightening the stud 6, the reflector holder 2 is sprung away from the drum D and therefore from the ring 3. Obviously, this is in the nature of a lever action, the stud representing the power. The fulcrum may be considered as located on the opposite side of the ring 2 and the weight distributed around the rim between the power and the fulcrum points.

The apparatus which I have shown and described embodies in concrete form my invention as is required but I do not limit myself to such specific form since various modifications will suggest themselves to those skilled in the art without departing from the spirit of my invention, the scope of which is measured by the claims herein contained.

What I claim as new and desire to secure by Letters Patent of the United States, is:

1. In combination, a reflector ring, a reflector mounted thereon, a drum, an end ring on said drum, means for securing said ring to said drum ring at one point and means for adjusting said reflector ring away from said drum ring at another point whereby warping strains in the mirror may be relieved or corrected, said second means comprising a screw device, said screw device mounted on said reflector ring and means adjacent said screw device for clamping said reflector ring to said drum ring at said adjusting point in the adjusted position.

2. In combination, a reflector ring, a reflector mounted thereon, a drum, an end ring on said drum, means for securing said reflector ring to said drum ring at a number of points and means for adjusting said reflector ring away from said drum ring at a number of points whereby warping strains in the mirror may be relieved or corrected, said second means comprising a screw device at each point of adjustment and means on either side of said screw device for clamping said reflector ring to said drum ring at each adjusting point in the adjusted position.

3. In a light projector, a reflector and a mounting therefor, said reflector having a configuration independent of said mounting while secured thereto, said mounting including a projector drum and a reflector holder, said holder secured to said drum at a number of points and means at a corresponding number of points on said mounting for bending said holder to relieve the reflector from any strains distorting its configuration.

4. In a light projector, a reflector and a mounting therefor, said reflector having a configuration independent of said mounting while secured thereto, said mounting including a projector drum and a reflector holder and means comprising a screw for bending the holder to relieve the reflector from any strains distorting its configuration.

5. In a light projector, a reflector and a mounting therefor, said reflector having a configuration independent of said mounting while secured thereto, said mounting including a projector drum and a reflector holder, said holder secured to said drum at a number of points and a screw at a corresponding number of points on said mounting for bending said holder to relieve the reflector from any strains distorting its configuration.

6. In a projector combination, a reflector ring and a reflector mounted thereon, a drum, an end ring on said drum, means for securing said ring to said drum at one point and a mechanical device secured to the projector for adjusting said reflector ring away from said drum ring at another point whereby warping strains in the mirror may be relieved.

In witness whereof, I have hereunto set my hand this 10th day of June, 1922.

FRANK A. BENFORD.